Figure 1:
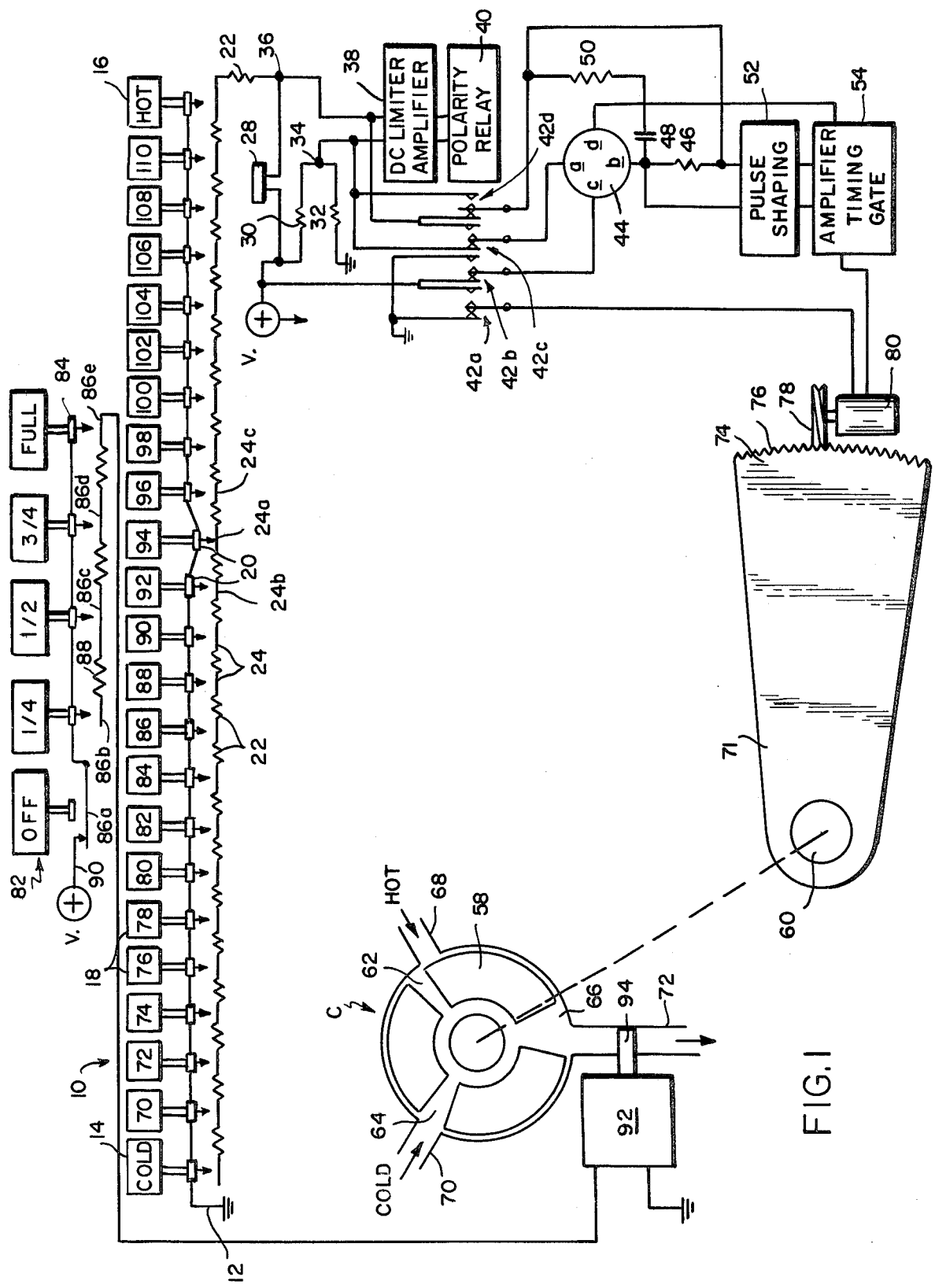

000
United States Patent [19]

Ts'ao

[11] 4,421,269
[45] Dec. 20, 1983

[54] SYSTEM FOR CONTROL OF WATER TEMPERATURE

[76] Inventor: Si-Ling Ts'ao, 3rd Floor, No. 1-1, Alley 16, Ln. 553, Section 4, Chung Hsiao East Rd., Taipei, Taiwan

[21] Appl. No.: 341,710

[22] Filed: Jan. 22, 1982

[51] Int. Cl.³ ............... G05D 23/00; F16K 31/02; H01C 10/46
[52] U.S. Cl. ............... 236/12.12; 236/78 C; 236/94; 236/12.18; 251/133; 318/641; 323/354; 338/185
[58] Field of Search ............... 236/12, 13, 94, 46 F, 236/75, 78 C, 78 B, 78 R, 12.12, 12.18, 12.19; 68/12 R; 200/340, 328; 251/133, 129, 131, 141; 323/353, 354; 318/641, 663, 672, 674; 338/69, 155, 185

[56] References Cited

U.S. PATENT DOCUMENTS

| | | | |
|---|---|---|---|
| 786,024 | 3/1905 | Gomborow | 318/674 X |
| 2,440,352 | 4/1948 | Van Vessem | 236/78 C X |
| 2,554,945 | 5/1951 | Fitzgerald | 236/78 B |
| 2,646,544 | 7/1953 | Sands | 236/78 B X |
| 2,860,298 | 11/1958 | Carlson | 318/674 X |
| 3,088,672 | 5/1963 | Simpson | 236/12 |
| 3,168,242 | 2/1965 | Diener | 236/75 |
| 3,420,969 | 1/1969 | Edwards et al. | 200/328 X |
| 3,686,557 | 8/1972 | Futamura | 318/672 X |
| 3,721,386 | 3/1973 | Brick et al. | 137/625.41 X |
| 4,072,268 | 2/1978 | Perris | 236/78 C |
| 4,322,031 | 3/1982 | Gehlert | 68/12 R X |

Primary Examiner—Albert J. Makay
Assistant Examiner—Harry Tanner
Attorney, Agent, or Firm—Robert T. Gammons

[57] ABSTRACT

A system for automatic control of water temperature by means of a plurality of pushbuttons or their equivalent bearing indicia identifying a range of available temperatures which, when actuated through appropriate circuitry, control the water valve setting as to the proportion of hot water to cold water and vice versa and as to the volume of water.

14 Claims, 5 Drawing Figures

4,421,269

SYSTEM FOR CONTROL OF WATER TEMPERATURE

BACKGROUND OF INVENTION

Currently, there are two modes of obtaining water of the right temperature for showers, baths and the like; a dual control system wherein the cold and hot water valves are alternately turned to the left or right or a single control system wherein a single valve is alternately turned to the left or right until the desired temperature is reached by testing with the hands. The purpose of the present invention is to enable automatically obtaining a desired temperature by actuating one of a plurality of buttons bearing the indicia of the range of temperatures available. Such means enables obtaining the desired water temperature faster, hence, with a saving in energy, eliminates the hazard of scalding and provides for a much more comfortable and enjoyable use of a shower or tub.

SUMMARY OF INVENTION

As herein illustrated, the invention resides in a system for control of water temperature from a valve having cold and hot water inlets and a discharge outlet and means for shifting the valve to one side to decrease the cold water and increase the hot water and to the other side to increase the cold water and decrease the hot water and comprises in combination motion-producing means for effecting movement of the means for shifting the valve and a control circuit embodying a plurality of means for selecting the temperature of the water desired from the valve which, when operated, produces a signal representing the selected temperature, sensor means for detecting the actual temperature of the water and producing a signal representing the actual temperature of the water and means for comparing the signals and transmitting the differential signal to the motion-producing means to cause the motion-producing means to shift the valve in a direction to decrease the differential between signals. For instance, the means for shifting the valve is a part provided with teeth and the motion-producing means comprises a reversible electric motor and worm driven thereby which meshes with the teeth. The valve contains a valve spool, rotatable to position the inlets and outlets, fixed to a shaft, the latter, in turn, being fixed to the toothed part. The means for selecting the temperature of the water are actuators which may be in the form of pressure-actuated means or touch buttons so coupled that the actuation of any actuator will disable the remaining actuators. There is volume control means comprising a valve positioned in the discharge opening movable therein from closed to open positions and vice versa and means for shifting the valve through a range of positions between said open and closed positions comprising an electromagnet. The volume control means is coupled to the actuators so that actuation of an actuator for a selected temperature will automatically position the valve in its fully open position, the position of the valve being thereafter alterable by selecting a selector of lesser volume. More specifically, the control circuit comprises a plurality of actuators labeled to indicate the range of temperatures available, a plurality of resistances in said circuit corresponding in number to the actuators, each actuator being operable to establish a current flow in the circuit independently of any other actuator, sensing means operable to determine the temperature of the water from the discharge opening, operable to establish a current flow in the circuit and comparing it with the current flow established by the selected actuator and means in the circuit for using the difference in the two currents to actuate the reversible electric motor. The means for comparing the current signals is a differential amplifier and limiter. The circuit includes a polarity relay for transmitting current through a vibrator switch which operates at one-half second intervals to alternately send signals to the reversible electric motor.

Figure 3:
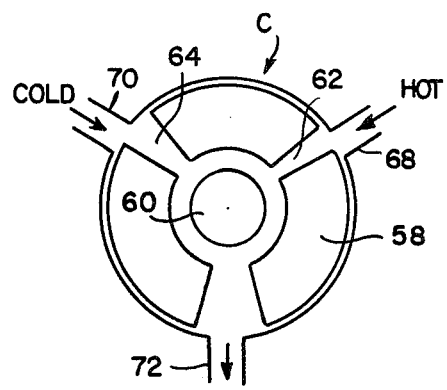
Figure 4:
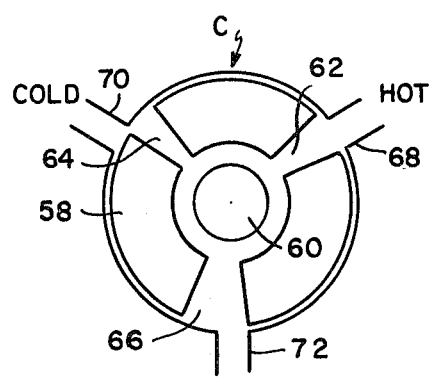
Figure 2:
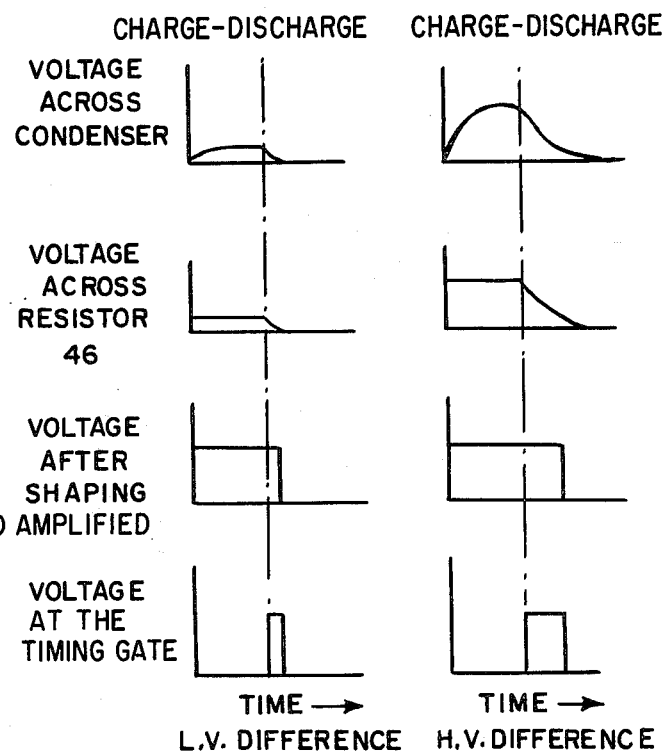
Figure 5:
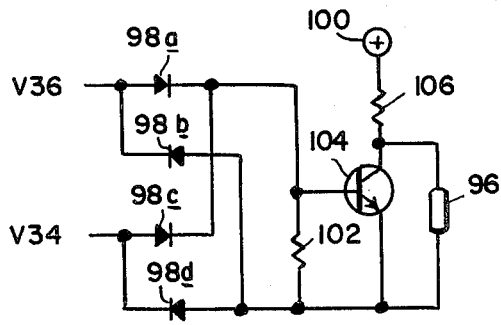

The invention will now be described in greater detail with reference to the accompanying drawings, wherein:

FIG. 1 schematically shows the control system for controlling the position of a valve, both for water temperature and volume;

FIG. 2 illustrates the voltages across the components in the circuit comprising the condenser, one of the main resistors, the pulse shaper and the time and gating circuits;

FIG. 3 diagrammatically shows the valve with the outlet partially open and the inlets fully open;

FIG. 4 shows the valve with the outlet fully open, the cold water inlet closed and the hot water inlet fully open; and FIG. 5 shows an indicating circuit containing a lamp which will light up when the water temperature reaches the desired temperature as selected by the user.

Referring to the drawings, there is disclosed a large number of pushbuttons 10 arranged in a row, all of which are electrically connected to a ground wire 12. At the left end of the row, there is a button 14 labeled COLD and, at the right end, there is a button 16 labeled HOT. Between the two buttons 14 and 16, there are buttons 18, each of which is labeled with a number representing specific temperature within a range of temperatures from 70° F. at the left end of the row to 110° F. at the right end of the row. The button 18 provide for selecting the temperature of the water which is desired. Each button is provided with a single contact 20 which can be moved to a position to initiate operation of the system to provide water of the temperature denoted by the indicia on the button. All of the buttons are mounted by well-known mechanism so that, when any one of the buttons is depressed, it is locked in the depressed position and disables the other buttons which have been locked therein by a previous operation. Thus, only one button among the number of buttons is locked at one time. A plurality of resistors 22 of constant resistance are connected by junctions 24 in series corresponding in number to the actuators 20 arranged so that the contacts 20 can have engagement with the junctions 24 between resistors. When any button is depressed, its associated contact 20 makes contact with the junction 24 of two adjacent resistors. The last of the resistors 22 at the right-hand end of the series of joined resistors is connected to one side of a temperature sensor 28. The other side of the temperature sensor 28 is connected to a positive voltage source V. This positive voltage source is also connected to two equal and identical resistors 30 and 32. The junction 34 of the resistors 30,32 and the junction 36 of the temperature sensor 28 with the series resistors 22 are connected to a DC differential amplifier and limiter 38 and polarity relay 40. A temperature sensor having a negative temperature coefficient is used, the resistance of which decreases as the water temperature increases. This temperature sensor may be placed at an appropriate place where the water temperature is the most important or where its temperature may generally reflect the whole situation. For example, it may be placed in the outlet head of a shower head or at the bottom center of a bathtub. The resistors 22 in the series of resistors are so designed that, when any button is depressed downward, the resistance of all the resistors from its contact to the junction 36 added together equal the resistance of the sensor 28 at the specified temperature indicated by the button depressed.

The voltages at the junctions 34 and 36 hereinafter designated V34 and V36 as previously indicated are fed to the DC differential amplifier and limiter 38 where small voltage difference between V34 and V36 will be amplified, but large differences in the voltage between V34 and V36 will be limited to a value that will not be so large as to burn out the polarity relay 40.

The polarity relay 40 is so designed that it is normally biased by a spring to the position shown in FIG. 1 when V36 is less than V34. This is the situation when the outlet water has a lower temperature than the selected desired temperature. The polarity relay is provided with a series of contacts 42a, 42b, 42c and 42d which always break before they make when it operates or releases.

The contacts 42b and 42c are connected to a switch 44 which may be a multivibrator-operated electric relay, an electronic switch or the like. The vibrator is designed to change from one state to the other in about one-half second. As connected, in the first one-half second period after the power supply is applied by depressing a button, the circuit from the terminal a to the terminal b of the switch 44 is closed and the circuit from the terminal c to the terminal d is open. In the next one-half second, the vibrator changes to the other state wherein the circuit from a to b is open and the circuit from c to d is closed. One-half second later, the vibrator switch reverses again and this repeats until the power supply is cut off after completing a shower or filling a tub or sink to the desired depth.

At the beginning of a call for water for shower or bath purposes, the water temperature from the outlet of the valve is generally lower than desired. The voltage V34 at the junction 34, accordingly, is higher than the voltage V36 at the junction 36. Accordingly, the current flows from the junction 34 through closed contacts 42c to the terminal a of the switch 44, then through the terminal b and through a large resistor 46 and from thence through the closed contacts 42d to the junction 36. At the same time, a condensor 48 is charged through a small resistor 50 rapidly, due to their low time constant. About one-half second later, the circuit from a to b is cut off and the circuit from c to d is closed. Now the condensor 48 discharges through the resistors 46 and 50.

FIG. 2, which includes eight graphs, represents the circuit shifting from the charging state to the discharging state. Thus, all of the curves at the left of the dotted lines represent various voltages during the charging state and all of the curves to the right of the dotted lines represent various voltages during the discharging state. All of the four curves at the left-hand side of FIG. 2 represent various voltages when the voltage difference between V34 and V36 is small or low. All of the four curves at the right-hand side represent the various voltages when the voltage difference between V34 and V36 is large or high. As shown in FIG. 1, the voltage across the resistor 46 is fed to pulse-shaping circuitry 52 which clips off the low voltage portions and their waves are shown as voltages after shaping in FIG. 2. These signals are further amplified in amplifier circuitry 54 which produces gating pulses as shown in the last two curves in FIG. 2. The left-hand portions of these curves are cut off because the circuit between junctions c and d of the switch 44 is open during this period.

A typical valve C for supplying water as controlled by this circuit is shown in FIGS. 1, 3 and 4 as comprising three arc-shaped pieces 58 spaced peripherally around and fixed to a shaft 60. The spacing of the pieces 58 define openings 62, 64 and 66. The openings 62, 64 are so positioned as to be moved into varying degrees of alignment by rotation of the shaft 60 with a hot water inlet 68 and a cold water inlet 70. The opening 66 is always in alignment with the discharge outlet 72. The shaft 60 also has fixed to it an arm 71 having at its distal end an arcuate portion 74 provided with teeth 76. A worm wheel 78 which meshes with the teeth 76 and is driven by a DC motor 80 provides for rotating the arm 71 and, hence, the shaft 60 and the arcuate valve parts 58. The motor 80 is reversible and is driven by the circuitry described above in opposite directions to alternately rotate the valve to bring it to a position of substantial equilibrium with respect to its admission of cold and hot water in such proportions as to match the selected temperature.

It is desirable not only to control the temperature of the water, but the volume of water, and the means for controlling the volume comprises five pushbuttons 82 marked OFF, $\frac{1}{4}$, $\frac{1}{2}$, $\frac{3}{4}$ and FULL, respectively. These markings indicate the amount of water from the outlet 72. Each button 82 is provided with a contact 84 which is movable by its button into contact with one of the contacts 86a, 86b, 86c, and 86e in a circuit containing three resistors 88. All of the contacts are connected together through a switch 90 to a positive voltage source V. One of the ends of the series of resistors is connected to an electromagnetic valve 92 which has a plunger 94 inserted into the water passage of the outlet 72.

The system works as follows: When a desired water temperature is decided upon, for example, if the pushbutton representing 94° water temperature is pressed, its contact 20 makes contact with the junction 24a between two of the resistors 22. If, for example, the water temperature of the cold inlet is below 94° F., then the resistance of the temperature sensor 28 is higher than the total resistance from the junction 24a to the junction 36. Therefore, the voltage V36 is lower than $\frac{1}{2}$V. This voltage is fed to the DC limiter 38 and amplified to operate the polarity relay 40. Now the condensor 48 charges during the first one-half second period, then discharges during the next one-half second period. The discharge voltage across the resistor 46 will be shaped, amplified and gated to produce a short pulse in the circuits 52 and 54. The duration of this short pulse is proportional to the voltage difference between the voltage V34 and the voltage V36. The current from the positive voltage V flows through the relay contacts, junction c and d of switch 44, the timing gate 54, the motor 80 rotates for a short time, causing the worm 78 to turn the arm 71 clockwise and, hence, the shaft 60 and the arcuate valve pieces 58 clockwise. FIG. 1 shows the condition of the cold water inlet when it opens completely, but with the hot water inlet completely closed. When the shaft 60 turns clockwise somewhat, the cold water inlet closes partially, but the hot water inlet opens partially as shown in FIG. 3. This turning works for a short time only, for instance, with a duration equivalent to only five or six teeth on the arcuate part 74 of the arm 71 for a maximum voltage difference between the voltage V34 and voltage V36. A one-tooth difference between V34 and V36 is equivalent to a difference of water temperature of 2° from the desired temperature. Then it will stop for one-half second. A further one-half second later, the same process repeats. Thus, the water valve turns only a few degrees, depending upon the voltage difference between V34 and V36 as the temperature of the water is measured by the temperature sensor 28. A few seconds later, the water may be hotter than desired. Then the resistance of the temperature sensor 28 is lower than the desired value, hence, voltage V36 at the junction 36 becomes higher than voltage V34 at the junction 34 and the polarity relay 40 operates. Meanwhile, the charging and discharging process repeat and the gate 54 opens for a short duration, but the current flows through the DC motor 80 in a reverse direction and, by turning the arm 71 counterclockwise, the water valve closes the hot inlet a little and opens the cold inlet a little wider to lower the temperatures of the outlet water. These operations may repeat until the desired temperature is reached. Now the voltage difference between V34 and V36 may be so little that the gate 54 closes all the time. The water valve will stay there without turning. The user may now enjoy a more stable washing temperature.

The pushbutton marked FULL is linked with the row of buttons 10 in such a way that if any one of the row of buttons 10 is depressed, the FULL button will be moved automatically to its operating position into contact with the junction 86e. The entire voltage V is thus applied to the electromagnetic valve 92 and withdraws the plunger 94 to its fully open position to permit the water to flow out quickly in a maximum volume. If it is desirable to save water, any one of the buttons between FULL and OFF may be pushed as, for example, the buttons marked ¼, ½ and ¾. Pressing these buttons inserts 1, 2 or 3 of the resistors 88 into the circuit, thereby reducing the current flow therein and thus partially closing the water outlet. When the water is to be shut off, the OFF button is depressed and this disables the power, allowing a spring on the electromagnetic valve 92 to move the plunger into the outlet 72 and thereby close the water outlet. Meanwhile, it releases any depressed button, including ¼, ½, ¾ and FULL, thus opening the power to all circuits.

FIG. 5 shows an indicator circuit containing a green lamp 96 which will light up when the water temperature reaches the desired temperature as selected by the user.

In the circuit, the voltages V34 and V36 represent, respectively, the voltages at the junctions 34 and 36 as shown in FIG. 1. There are four diodes 98a to 98d in the circuit connected into a bridge circuit containing a resistor load 102 and a transistor 104. A resistor 106 connects the transistor to a positive voltage source 100. When the voltage difference between V34 and V36 is large, there is a voltage across the resistor 102. This biases the transistor 104 in a direction to cause current flow through the resistor 106 and the transistor 104. The voltage across the lamp 96 is, accordingly, very low and will not light up. When the voltage difference between V34 and V36 is very low, as when the water temperature is equal to or nearly equal to the desired temperature selected, the voltage across the resistor 102 is zero or very small, hence, either there is no current flow through the transistor 104 or so little flow that the voltage across the lamp 96 becomes high enough to light up the lamp. The user now knows that the desired water temperature has been reached.

The buttons 10 may be mechanical, operating directly on their contacts by applying pressure thereto or through relays or through electronic circuits or touch buttons with proper electronic circuits without up or down movement by the buttons themselves. The number of buttons may be more or less than shown. The indicia on the buttons 10 to indicate desired water temperatures may be changed to meet different requirements. The temperature sensor 28 may be a thermistor, a semiconductor temperature sensor, a resistance temperature detector or the like. The method of turning the water valve by a DC motor may be replaced by relays and the ratchet wheel with the proper change of DC pulses into AC pulses with a number of frequencies proportional to the deviation of the water temperature from the desired one. Other conventional mechanical means can be used to rotate the water valve.

Although the circuit illustrated here uses discrete electronic parts to achieve the object, a modern microprocessor may be used to reach the same goal.

A rotary switch may be used to replace the buttons arranged in a row, as shown in FIG. 1, and the buttons may be placed in a circle. A ground contact mounted upon a rotary dial having an arrow engraved on its top face may be rotated to connect any one of the buttons to the ground circuit to select the desired water temperature. The temperature indications may be placed on the buttons, but the buttons themselves need not be movable in up and down directions.

It should be understood that the present disclosure is for the purpose of illustration only and includes all modifications or improvements which fall within the scope of the appended claims.

What is claimed is:

1. A system for control of water temperature from a valve having cold and hot water inlets and a discharge outlet comprising a reversible motor means to shift said valve to one side to decrease the cold water and increase the hot water and to the other side to increase the cold water and decrease the hot water, including a worm gear means to reduce the speed of the motor, a control circuit embodying a plurality of first selectively operable pushbutton means representing a range of water temperature from cold to hot and further including a plurality of resistances corresponding in number to said pushbuttons, each pushbutton being operated to produce a resistance value representing said, hence, the desired water temperature, sensor means for detecting the actual temperature of the water from said outlet and also to produce a resistance value, said resistance values of desired water temperature and actual water temperature being combined to produce a signal, signal means, comparison means including a vibrator switch comparing said signals produced by said signal means at regular intervals for detecting their differential, said comparison means also including a polarity relay for detecting the polarity of said differential, hence, the direction of rotation of said reversible motor means, a DC limiter and pulse-shaping means to control the angle of rotation of said valve in a direction to decrease said differential in temperature to a minimum and stabilize at said selected water temperature and indicator means including a lamp lighting up when said differential in temperature becomes a minimum.

2. A system according to claim 1 wherein there is water volume control means comprising a plurality of second selectively-operable means, each labeled with a fractional number indicating water discharged from said outlet compared to maximum volume output, a plurality of resistances corresponding in number to said second pushbutton means, electromagnetic means controlling the opening of said discharge outlet and means responsive to the actuation of any of said second pushbutton means to provide a desired water volume flow through said outlet.

3. A system according to claim 2 wherein there is means coupling the volume control means to selectively operable pushbutton means so that selection of any one of said pushbutton means automatically positions the valve for maximum flow.

4. A system according to claim 1 wherein the valve contains a valve spool rotatable relative to the inlets and outlet wherein there is a shaft to which the valve spool is fixed and the means for shifting the valve fixed to said shaft.

5. A system according to claim 4 wherein the means for shifting the valve is an arm fixed at one end to the shaft, the arm being provided with an arcuate array of teeth meshing with the worm.

6. A system according to claim 2 wherein the volume control means includes means for reducing the flow which, upon actuation, disables any of said second pushbutton means providing for greater volume of flow.

7. A system according to claim 2 wherein the volume control means comprises a gate positioned in the discharge outlet movable therein from a closed to an open position and vice versa and wherein the electromagnetic means provides for shifting the gate through a range of positions between said open and closed positions.

8. A system according to claim 2 wherein the volume control means comprises means for selecting fully open, fully closed and intermediate the fully open and closed positions three positions—¼ open, ½ open and ¾ open.

9. A system according to claim 2 wherein the control means comprises a circuit in which the fully open position of the valve is achieved by establishing a direct flow of current through a conductor to said electromagnetic means which provides for opening and closing the valve.

10. A system according to claim 9 wherein the volume control means comprises a circuit in which the fully closed position of the valve is achieved by disabling the flow of current through the conductor to the electromagnet.

11. A system according to claim 9 wherein the control means comprises a circuit in which there are three resistances in series for altering the current flow through the conductor to the electromagnetic to provide for ¼, ½ and ¾ flow.

12. A system according to claim 1 wherein there is a vibrator switch operable at one-half second intervals to alternately transmit the small signals and large signals to the motor means.

13. A system according to claim 1 wherein there is an indicator circuit operable when the differential between signals becomes minimal to produce a signal indicative that the temperature of the water desired has been reached.

14. A system according to claim 1 wherein there is an indicator circuit containing a lamp which lights when the difference between signals becomes minimal.

* * * * *